United States Patent
Liu et al.

(10) Patent No.: US 10,979,178 B2
(45) Date of Patent: Apr. 13, 2021

(54) MECHANISM FOR SHORT GUARD INTERVAL INDICATION IN HIGH EFFICIENCY WLAN

(71) Applicant: MEDIATEK INC., Taiwan (CN)

(72) Inventors: Jianhan Liu, San Jose, CA (US); Tianyu Wu, Fremont, CA (US); Shengquan Hu, Cupertino, CA (US); Thomas Edward Pare, Jr., Mountain View, CA (US)

(73) Assignee: MEDIATEK INC.

(*) Notice: Subject to any disclaimer, the term of this patent is extended or adjusted under 35 U.S.C. 154(b) by 0 days.

(21) Appl. No.: 15/794,981

(22) Filed: Oct. 26, 2017

(65) Prior Publication Data
US 2018/0131469 A1 May 10, 2018

Related U.S. Application Data

(60) Provisional application No. 62/417,388, filed on Nov. 4, 2016.

(51) Int. Cl.
H04L 1/06 (2006.01)
H04L 5/00 (2006.01)
(Continued)

(52) U.S. Cl.
CPC .......... H04L 1/0643 (2013.01); H04L 1/0003 (2013.01); H04L 1/0009 (2013.01);
(Continued)

(58) Field of Classification Search
None
See application file for complete search history.

(56) References Cited

U.S. PATENT DOCUMENTS

2016/0119453 A1* 4/2016 Tian .................. H04L 5/04
370/338
2017/0303279 A1 10/2017 Park et al.
(Continued)

FOREIGN PATENT DOCUMENTS

| TW | 201618501 A | 5/2016 |
| WO | 2017007266 A1 | 1/2017 |
| WO | 2017022897 A1 | 2/2017 |

OTHER PUBLICATIONS

Jianhan Liu et al., "IEEE P802.11 Wireless LANs: 0.8us GI with 4x HE-LTF", Oct. 23, 2016, XP055458318, Retrieved form the Internet: URL: https://mentor.ieee.org/802.11/dcn/16/11-16-1438-04-00ax-0-8us-gi-with-4x-he-ltf.docx [Retrieved on Mar. 12, 2018].
(Continued)

*Primary Examiner* — Chi H Pham
*Assistant Examiner* — Raul Rivas

(57) ABSTRACT

Systems and methods of expanding indication capabilities of existent PPDU preamble fields. The "GI+LTF Size" field is redefined to indicate a new combination of GI duration and HE-LTF size. The redefinition is indicated when the values of the two other existent fields, in combination, indicate an invalid scenario because the two values should have been mutually exclusive. Particularly, the DCM field and the STBC field are both set to the "enabled" mode as an indication for redefine the "GI+LTF Size" field. Upon receiving such a PPDU, a receiver is configured to resolve the PPDU as neither DCM nor STBC is enabled. Rather, the receiver interprets the particular combination of DCM and STBC values as an indication that the "GI+LTF Size" field is redefined to indicate the new combination of GI duration and HE-LTF size.

10 Claims, 5 Drawing Sheets

(51) Int. Cl.
  *H04L 27/26*   (2006.01)
  *H04L 1/00*    (2006.01)
  *H04W 84/12*   (2009.01)

(52) U.S. Cl.
  CPC ........ *H04L 5/0091* (2013.01); *H04L 27/2613* (2013.01); *H04W 84/12* (2013.01)

(56) References Cited

U.S. PATENT DOCUMENTS

2018/0132109 A1* 5/2018 Lim .................. H04L 1/00
2019/0165883 A1* 5/2019 Chun ................ H04L 1/00

OTHER PUBLICATIONS

Lochan Verma (Qualcomm): "Bit filed finalization of HE-SIG-A", IEEE Draft:11-16-091501-00AX-TEXT-FOR-BIT-FIELD-FINALIZSTION-OF-HE-SIG-A, IEEE-SA Mentor, Piscataway,NJ USA, vol. 802.11ax, No. 1, Jul. 26, 2016, pp. 1-6, XP068107240, Retrieved form the Internet: URL: https://mentor.ieee.org/802.11/dcn/16/11-16-0915-01-00ax-text-for-bit-field finalization-of-he-sig-a.docx [Retrived on Jul. 26, 2016].

* cited by examiner

MECHANISM FOR SHORT GUARD INTERVAL INDICATION IN HIGH EFFICIENCY WLAN

CROSS REFERENCE TO RELATED APPLICATION

This patent application claims priority and benefit of U.S. Provisional Patent Application No. 62/417,388, entitled "METHODS FOR SHORT GI INDICATION IN HE WLAN," filed on Nov. 4, 2016, the entire content of which is herein incorporated by reference for all purposes.

TECHNICAL FIELD

Embodiments of the present disclosure relate generally to the field of network communication, and more specifically, to the field of communication protocols in Wi-Fi network communication.

BACKGROUND OF THE INVENTION

In high efficiency wireless communication, the preamble of a Physical Layer Convergence Protocol (PLCP) protocol data unit (PPDU) may contain high efficiency (HE) long training field (LTF) (HE-LTF) symbols used to for channel estimation at a receiver. For example, the receiver can estimate the multiple input multiple output (MIMO) channel between the set of constellation mapper and the receiver chain based on the HE-LTF. Alternatively, if space time block coding (STBC) is applied to the PPDU, the HE-LTF provides a means for the receiver to estimate the MIMO channel between the STBC encoder outputs and the receiver chain.

The IEEE 802.11ax Standard and Specifications define HE-LTF durations by means of compression to optimize performance for individual scenarios. The HE physical layer provides support for 3.2 μs (1×HE-LTF ¼ compressed), 6.4 μs (2×HE-LTF ½ compressed), and 12.8 μs (4×HE-LTF uncompressed) LTF symbol durations.

Between symbols in the HE-LTF, a guard interval (GI) is inserted and used to prevent inter-symbol interference (ISI), e.g., due to echoes or reflections in the channels. Adding a GI between symbol transmissions allows these echoes and reflections to settle before the next symbol is transmitted. A long GI between symbols can effectively prevent ISI, but inevitably increases overhead due to the additional idle time. On the other hand, a short GI can increase data transmission throughput. However, if it's too short, the amount of ISI will increase and thereby counteract the transmission throughput.

Beamforming has become the most commonly used transmission mode for communication in compliance with the IEEE 802.11n/ac/ax Standards and Specifications, where compressed channel state information (CSI) feedback discards the common angle for each feedback vector. Therefore, in the beamforming scenarios, both single user (SU) MIMO and multi-user (MU) MIMO, 1× and 2×HE-LTFs sometimes cannot be successfully interpolated to 4×HE-LTFs due to the phase ambiguity among different subcarriers. Particularly, phase alignment cannot guarantee that an interpolated channel matches the real channel because of the numerous different channels. For some channels, the channel phases themselves do not match the aligned phases that are introduced. For the cases that phase alignment cannot guarantee the channel to be interpolated correctly, using 4×LTF is typically the solution.

According to the IEEE 802.11ax, 2 bits in PPDU preamble are allocated for a "GI+LTF size" field to define only 4 possible combinations of HE-LTF size and GI duration. Namely, "GI+LTF Size"=0 indicates a 1×HE-LTF with 0.8 μs GI; "GI+LTF Size"=1 indicates a 2×HE-LTF with 0.8 μs GI; "GI+LTF Size"=2 indicates a 2×HE-LTF with 1.6 μs GI; "GI+LTF Size"=3 indicates a 4×HE-LTF with 3.2 μs GI. These 4 modes indicated by the "GI+LTF Size" are not the optimal combinations for all types of PPDU transmissions. To use a 4×HE-LTF, all the orthogonal frequency-division multiple access (OFDMA) symbols in the payload must use GI of 3.2 μs. However, for most SU MIMO or MU MIMO cases, channel delay spreads are shorter than 3.2 μs. Compared to 0.8 μs GIs, using 3.2 μs GIs reduce data transmission rate up to about 21%.

Unfortunately, constrained by the existent PPDU structures with all the preamble bits already used or reserved for specific indications, it is difficult to introduce any additional HE-LTF/GI mode since the "GI+LTF size" field only has 2 bits and cannot indicate more than 4 combination options.

SUMMARY OF THE INVENTION

Accordingly, disclosed herein are embodiments directed to mechanisms of overcoming the bit length constraint of the "GI+LTF size" field and providing indication for one or more additional modes of GI duration and HE-LTF size in a Physical Layer Convergence Protocol (PLCP) protocol data unit (PPDU) without requiring any change in existent PPDU structures.

Embodiments of the present disclosure redefine two existent fields in the PPDU preamble as an indication for a new mode of GI duration and HE-LTF size (or referred to as "GI/HE-LTF mode" herein), in conjunction with the field dedicated for indicating GI/HE-LTF mode ("GI+LTF Size" field). Particularly, the two fields are set to values that, in combination, would conventionally represent an impossible or invalid scenario. When a receiver receives the PPDU, the particular combination of the two field values is interpreted as an indication (or part of an indication) for the new mode of GI/HE-LTF, while the original meanings indicated by these values individually are ignored.

In some embodiments, the dual carrier modulation (DCM) field and the space time block coding (STBC) field in PPDU preamble are used for introducing a new mode of GI/HE-LTF size that cannot be represented by any value of the "GI+LTF Size" field alone. The new mode can be 4×HE LTF with 0.8 μs or 1×HE LTF with 0.4 μs GI, and etc. For indicating such a new mode, both the DCM and the STBC fields are set to 1 (both enabled), and, for example, the "GI+LTF size" is set to 3. As DCM and STBC cannot be both enabled for a PPDU, a receiver is configured to resolve the PPDU as neither DCM nor STBC is enabled. Rather, the receiver interprets the particular combination of DCM=1 and STBC=1 as an indication that the "GI+LTF Size" field is redefined. If the "GI+LTF Size" field is set to 3 which by itself indicates 4×LTF with 3.2 μs GI, the receiver treats it as an indication of the new mode of 4×LTF with 0.8 μs GI.

Hence, according to embodiments of the present disclosure, a GI/HE-LTF mode that cannot be indicated by the "GI+LTF Size" field alone can be advantageously indicated by combining specific values of two other existent fields. This approach advantageously makes efficient use of the existent fields in PPDU preamble and expands the indication capabilities of the fields. As a result, an indication for a new operation mode or other specification can be introduced without requiring any format or structure change in existent PPDU preambles.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
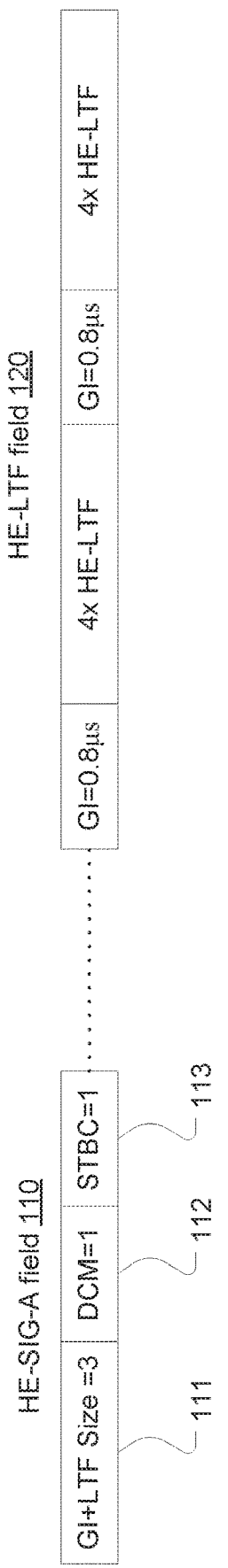
FIG. 1 illustrates exemplary high efficiency (HE) single user (SU) PPDU fields configured to indicate a redefined GI/HE-LTF mode for the PPDU according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Mechanism for Short Guard Interval Indication in High Efficiency WLAN

Overall, embodiments of the present disclosure provide a mechanism of expanding the indication capabilities of the existent PPDU preamble fields. In some embodiments, the "GI+LTF Size" field is redefined to indicate a new mode (or redefined mode herein) of guard interval (GI) duration and high efficiency long training field (HE-LTF) size. The redefinition is indicated when the values of the two other existent fields, in combination, indicate an invalid scenario because the two values should have been mutually exclusive.

Embodiments of the present disclosure are described in detail with reference to the Physical Layer Convergence Protocol (PLCP) protocol data unit (PPDU) structure as defined in the IEEE 802.11 family. However, the present disclosure is not limited to any specific packet formats or structures, nor limited to any specific industry standards or specifications.

FIG. 1 illustrates an exemplary high efficiency (HE) single user (SU) PPDU configured to indicate an additional redefined GI/HE-LTF mode for the PPDU according to an embodiment of the present disclosure. Assuming the "GI+LTF Size" field has 2 bits and, by this field itself, can only indicate 4 fixed combinations of GI duration and LTF size as shown in Table 1, as defined in the IEEE 802.11ax Standard and Specifications.

TABLE 1

| Bit ID: | Field ID: | Number of bits: | Description: |
|---|---|---|---|
| B21-B22 | GI + LTF Size | 2 | Indicates the GI duration and HE-LTF size. Set to 0 to indicate a 1x HE-LTF and 0.8 µs GI Set to 1 to indicate a 2x HE-LTF and 0.8 µs GI Set to 2 to indicate a 2x HE-LTF and 1.6 µs GI Set to 3 to indicate a 4x HE-LTF and 3.2 µs GI |

The DCM field has 1 bit and is used to indicate whether or not DCM is applied to the data field for the Modulation and Coding Scheme (MCS) indicated. When the DCM field is set to 1, it is indicated that DCM is applied; and when the DCM field is set to 0, it is indicated that DCM is not applied. DCM is only applied to MCS0, MCS 1, MCS 3 and MCS 4. The STBC field has 1 bit and usually is used to indicate if space time block coding is used on the PPDU when the field is set to 1. DCM is not applied if STBC applied. In this example, the fields of GI+LTF Size 114, DCM 112 and STBC 113 are all included in the HE-SIG-A field 110 which is contained in the PPDU preamble.

As stated above, it is desirable to be able to use other combinations of GI duration and LTF size, such as 4×HE-LTF with a GI duration that is shorter than 3.2 µs. According to embodiments of the present disclosure, as shown in FIG. 1, both the DCM field 112 and the STBC field 113 are set to 1 to indicate that the "GI+LTF Size" field 111 is redefined to indicate a combination aside from the four as shown in Table 1. The HE-LTF field 120 in the PPDU is configured with the indicated combination accordingly.

As DCM enablement and STBC enablement are mutually exclusive for a PPDU, a receiver is configured to resolve the PPDU carrying DCM=1 and STBC=1 as neither DCM nor STBC is enabled. Rather, the receiver advantageously interprets the combination of DCM=1 and STBC=1 as an indication that the "GI+LTF Size" field is redefined. For example, if the "GI+LTF Size" field is set to 3 (as illustrated) which by itself indicates 4×LTF with 3.2 µs GI, the receiver interprets it as an indication of the new mode of 4×LTF with 0.8 µs GI. If the "GI+LTF Size" field is set to 0 which by itself indicates 1×LTF with 0.8 µs GI, the receiver interprets it as an indication of the new mode of 1×LTF with 0.4 µs GI. It will be appreciated that any other redefined mode of GI duration and LTF size can be indicated by the DCM field, the STBC field and the "GI+LTF Size" field without departing from the scope of the present disclosure. Further, the present disclosure is not limited to using the DCM field and the STBC field for indicating redefinition of the "GI+LTF Size" field. Various suitable fields that are original assigned for indicating other specifications may also be used for purposes of practicing the present disclosure.

Hence, according to embodiments of the present disclosure, a GI/HE-LTF mode that cannot be indicated by the "GI+LTF Size" field alone can be advantageously indicated by combining specific values of two other existent fields. This approach advantageously enables efficient use of existent fields in a PPDU preamble and expands the indication capabilities of these fields. As a result, an indication for a new operation mode or other specification can be introduced without requiring any existent format or structure change in a PPDU preamble.

Figure 2:
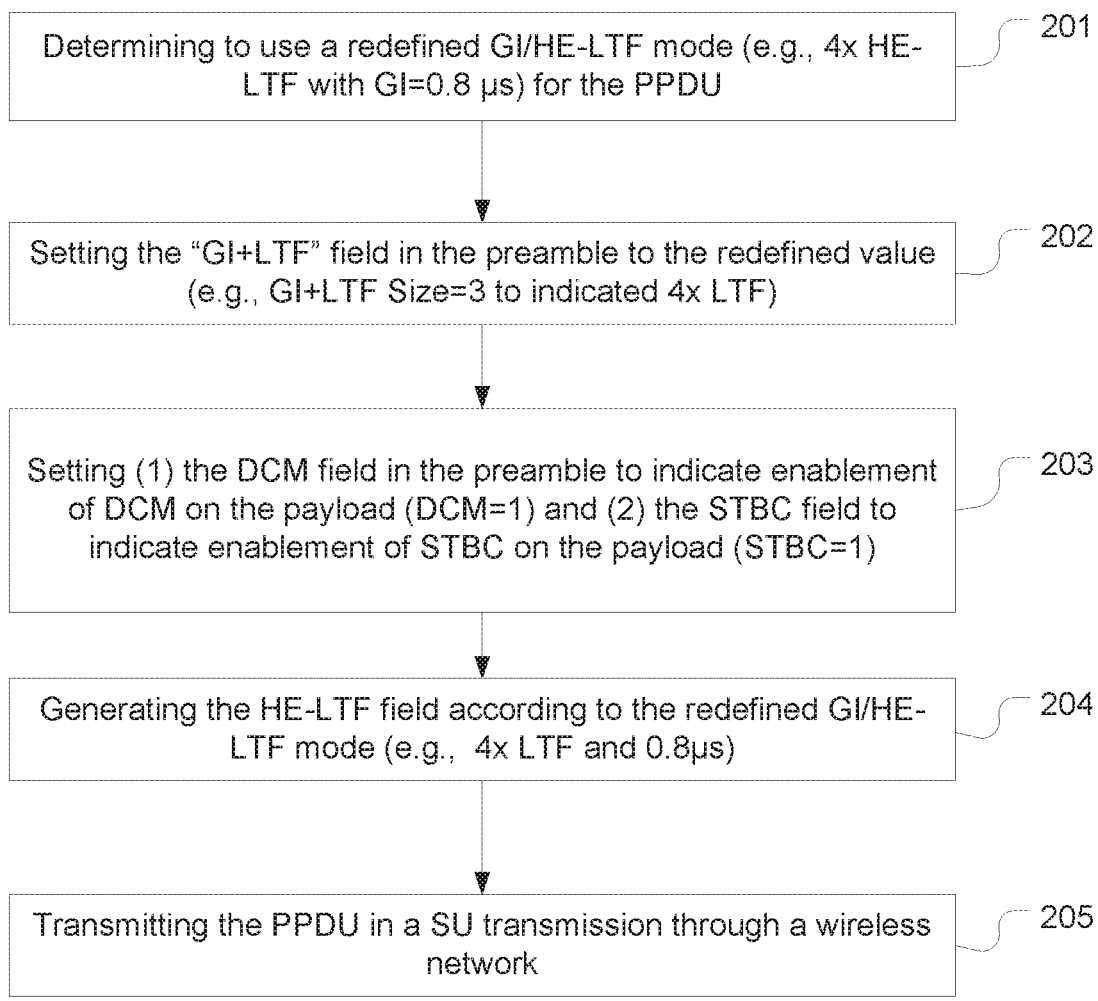
FIG. 2 is a flow chart depicting an exemplary process of generating a PPDU including redefining the "GI+LTF Size" field according to an embodiment of the present disclosure.

FIG. 2 is a flow chart depicting an exemplary process 200 of generating a PPDU including redefining "GI+LTF Size" field according to an embodiment of the present disclosure. Process 200 can be performed by pertinent components in a transmitter device, such as a wireless access point (AP) station (STA) or a non-AP STA. In this example, it is assumed that the "GI+LTF Size" field, the DCM field and the STBC field are each assigned with the same indication functions as described with reference to FIG. 1.

At 201, it is decided to use a redefined GI/HE-LTF mode for the PPDU (for example, 4×HE-LTF with 0.8 µs GI), which is not included in the modes that can be indicated by the 2-bit "GI+LTF Size" field alone. For example, this redefined mode is selected because the PPDU is to be transmitted in a multiple input and multiple output (MIMO) transmission. However, the present disclosure is not limited to such application.

At 202, the "GI+LTF Size" field is set to a redefined value to indicate the desired choice of HE-LTF size according to the redefinition. In this example, "GI+LTF Size" is set to 3 which indicates 4×LTF. At 203, the DCM field is set to indicate enablement of DCM on the payload of the PPDU (e.g., DCM=1), and the STBC field is set to indicate enablement of STBC on the payload of the PPDU (e.g., STBC=1). As enablement of both DCM and STBC on the payload is an invalid scenario, the enablement settings indicate that neither DCM or STBC is enabled for the payload, but rather indicate that value of the value in the "GI+LTF Size" field is used to indicate a new mode of GI/HE-LTF combination. In this example, with DCM=1 and STBC=1, "GI+LTF Size"=3 does not indicate 4×LTF with 3.2 µs according to the original definition, and instead indicates 4×LTF with 0.8 µs according to the redefinition. For another example, with DCM=1 and STBC=1, "GI+LTF Size"=0 can be used to indicate 1×LTF with 0.4 µs, and etc.

Accordingly, the HE-LTF field of the PPDU is generated by using the redefined mode, e.g., 4×LTF with 0.8 µs. At 205, the PPDU is transmitted through a wireless network in a SU MIMO transmission. The present disclosure can also be used for other suitable types of transmissions, e.g., MU-MIMO transmissions.

Figure 3:
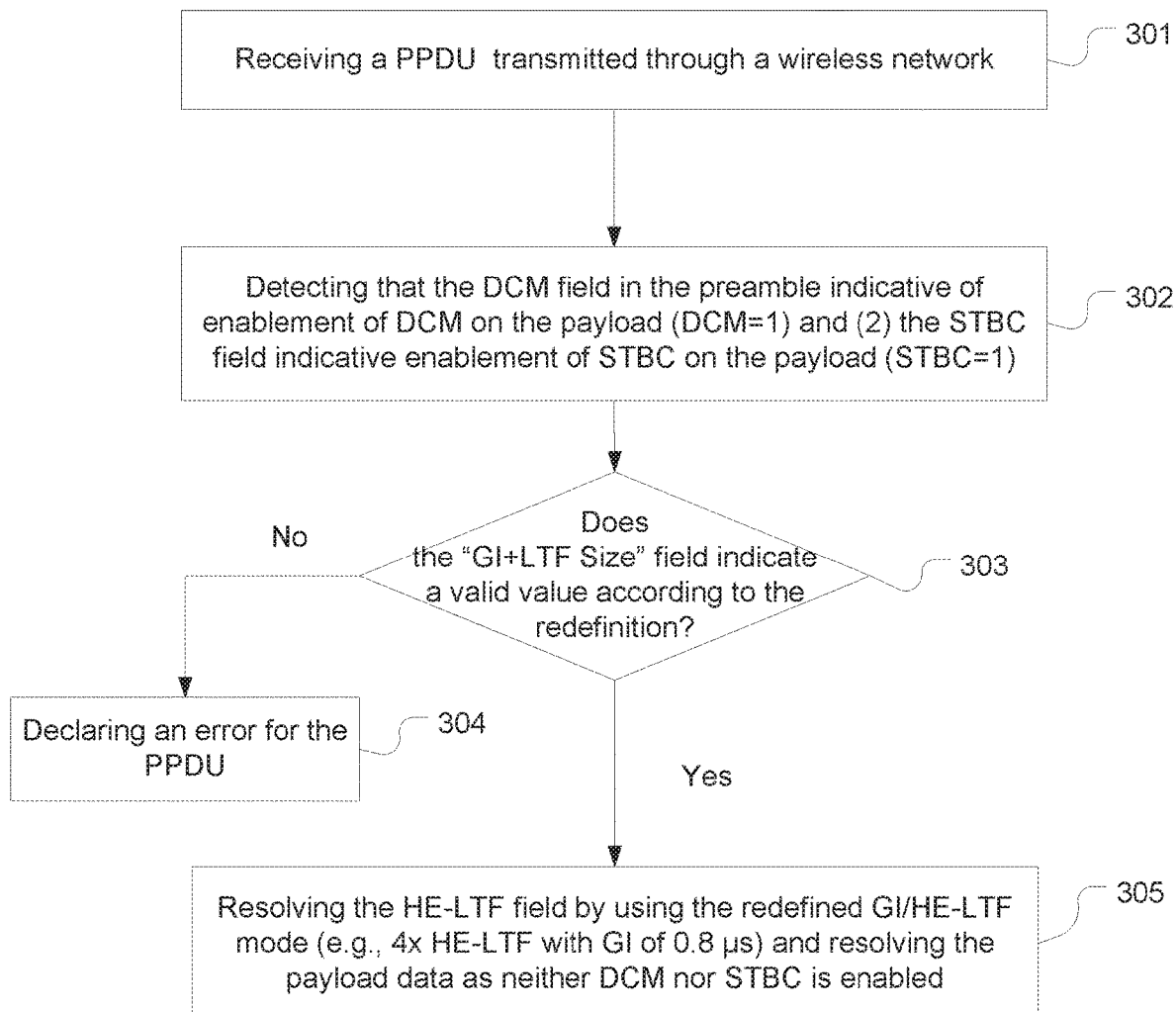
FIG. 3 is a flow chart depicting an exemplary process of resolving a PPDU with the "GI+LTF Size" field redefined according to an embodiment of the present disclosure.

FIG. 3 is a flow chart depicting an exemplary process 300 of resolving a PPDU with the "GI+LTF Size" field redefined according to an embodiment of the present disclosure. Process 300 can be performed by pertinent components in a receiver device, such as a wireless access point (AP) station (STA) or a non-AP STA. For example, the received PPDU is originated through a PPDU generation and transmission process as described with reference to FIG. 2. In this example, it is assumed that the "GI+LTF Size" field, the DCM field and the STBC field are each assigned with the same indication functions as described with reference to FIGS. 1 and 2.

At 301, a PPDU packet is received at the receiver. At 302, the receiver detects that the DCM field in the PPDU preamble is set to indicate DCM enablement on the payload of the PPDU (e.g., DCM=1), and that the STBC field is set to indicate STBC enablement on the payload of the PPDU (e.g., STBC=1). In response, the receiver resolves the PPDU as neither DCM nor STBC is enabled. At 303, the receiver further determines whether the "GI+LTF Size" field is set to a valid value according to the redefinition of this field. In this example, with DCM=1 and STBC=1, only "GI+LTF Size"=3 is a valid value. Thus, if it is detected that the "GI+LTF Size" field is not set to the valid value, an error is declared for the PPDU at 305. If the "GI+LTF Size" field indicates the valid value, the receiver, particularly the channel estimator thereof, resolves the HT-LTF field by using the redefined GI/HE-LTF mode, e.g., 4×LTF with 0.8 µs. The payload data is resolved as neither DCM nor STBC is enabled.

Processes 200 and 300 can be implemented as software logic, hardware logic, firmware logic, or a combination thereof.

Figure 4:
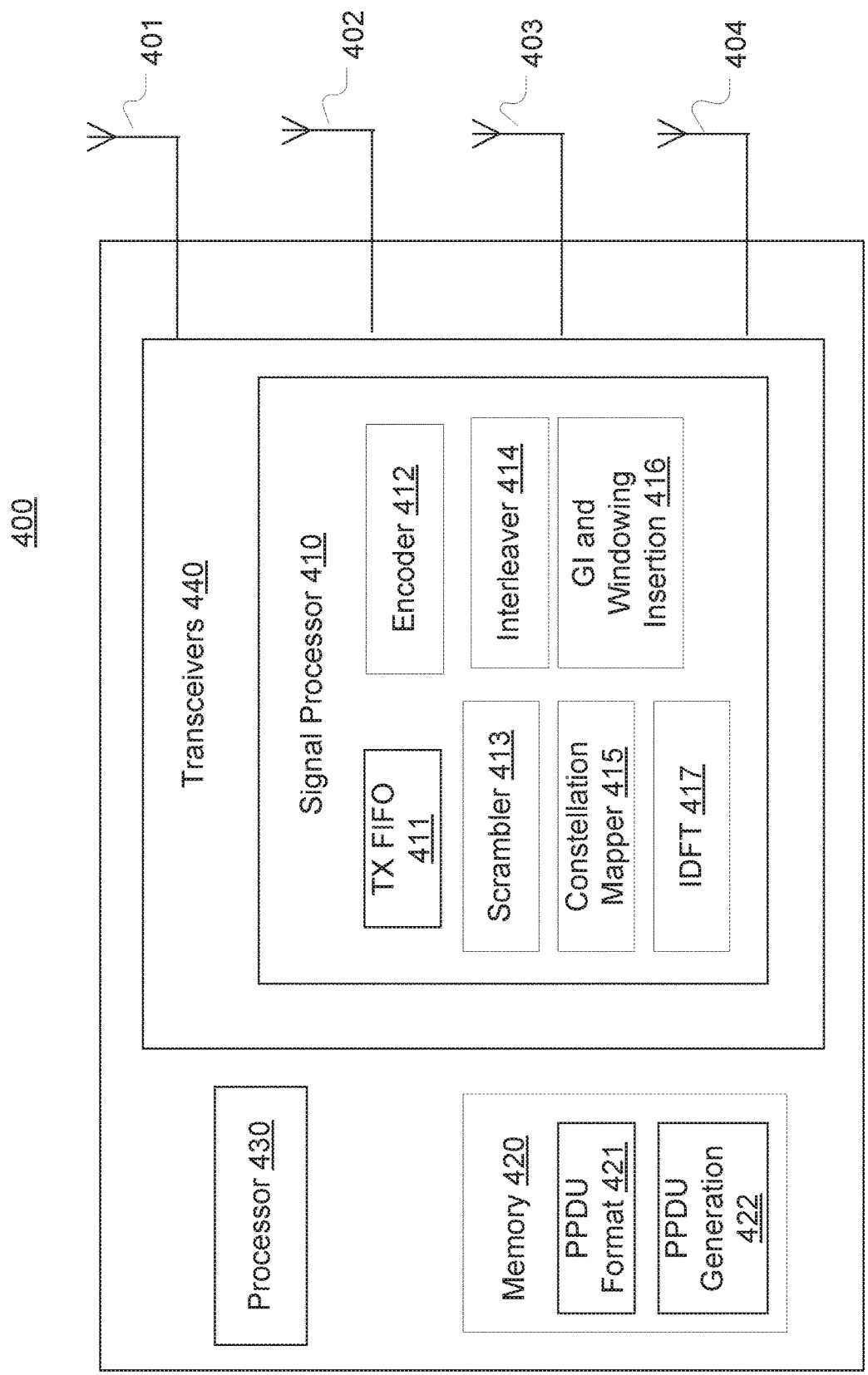
FIG. 4 is a block diagram illustrating the configuration of an exemplary wireless communication device operable to generate a PPDU with a redefined GI/HE-LTF mode according to an embodiment of the present disclosure.

FIG. 4 is a block diagram illustrating the configuration of an exemplary wireless communication device 400 operable to generate a PPDU with a redefined GI/HE-LTF mode according to an embodiment of the present disclosure. The device 400 may be an AP STA or a non-AP STA and can transmit PPDUs to another device through a wireless LAN. The device 400 is configured to generate a PPDU using a redefined GI duration and HE-LTF size that cannot be indicated by the "GI+HE-LTF Size" field alone.

The device 400 may be a general-purpose computer or any other type of computing device or network device, including a main processor 430, a memory 420 and a transceiver 440 coupled to an array of antenna 401-404. The transceiver 440 includes a signal processor 410 having various modules of the transmit path which is configured to generate each section of a PPDU or any other type of communication transmission units. For instance, the signal processor 410 includes a transmit First-In-First-Out (TX FIFO) 411, an encoder 412, a scrambler 413, an interleaver 414, a constellation mapper 415, an inversed discrete Fourier transformer (IDFT) 417, and a GI and windowing insertion module 416.

The memory 430 stores the PPDU format 421 including the format with a redefined "GI+HE-LTF Size" field. The PPDU generation module 422 stores processor-executable instructions for generating data sequences as well as configurations of other parts of PPDUs according to the PPDU format 421. The PPDU generation module 422 may decide to use a redefined GI/HE-LTF mode, and the signal processor 410 generates the preamble and the HE-LTF field accordingly, as described in greater detail with reference to FIGS. 1 and 2.

Figure 5:
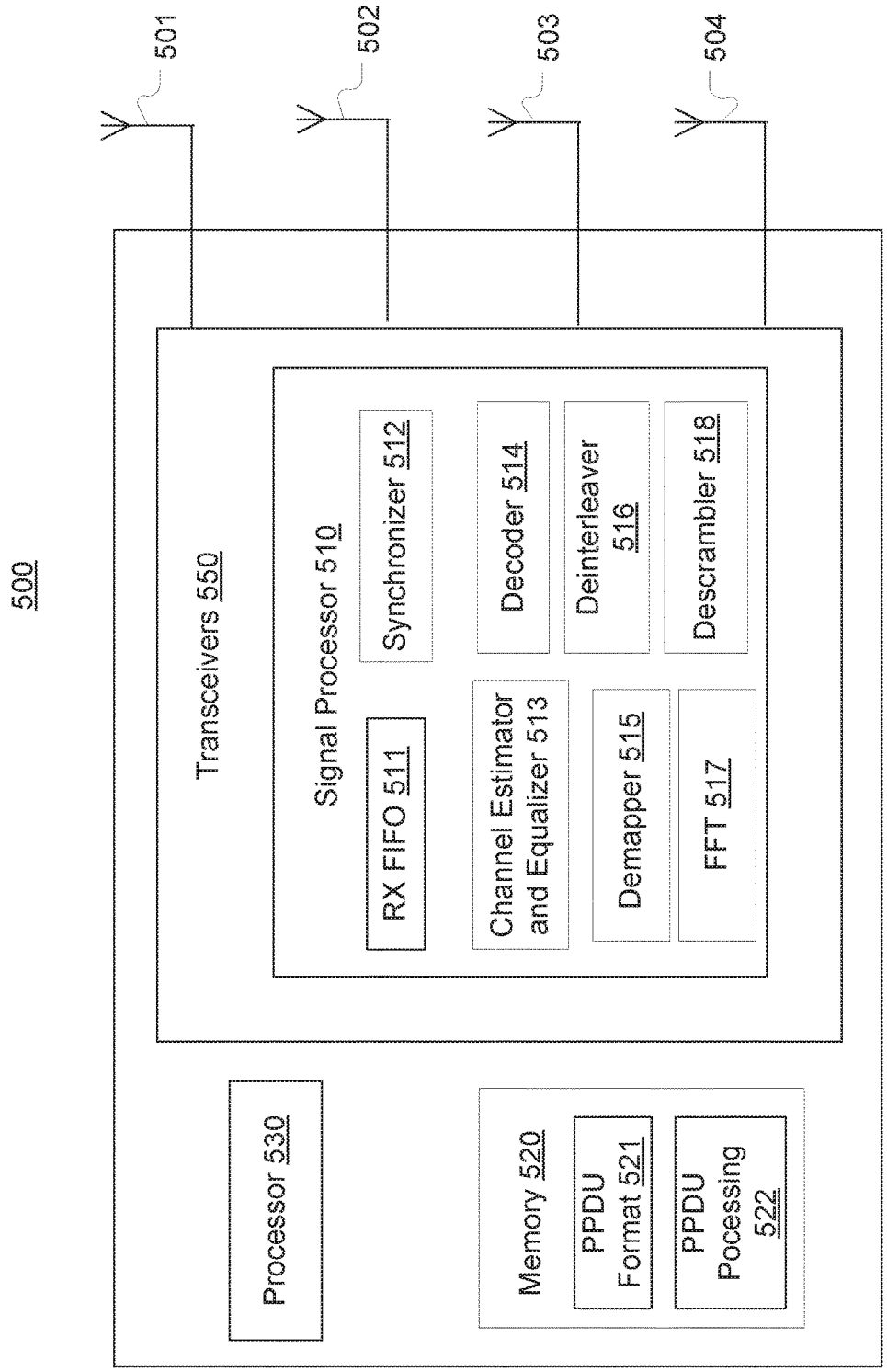
FIG. 5 is a block diagram illustrating the configuration of an exemplary wireless communication device operable to resolve a received PPDU with a redefined GI/HE-LTF mode according to an embodiment of the present disclosure.

FIG. 5 is a block diagram illustrating the configuration of an exemplary wireless communication device 500 operable to resolve a received PPDU with a redefined GI/HE-LTF mode according to an embodiment of the present disclosure. The device 500 may be an AP STA or a non-AP STA and can transmit PPDU to another device through a wireless LAN. The device 400 is configured to resolve a received PPDU using a combination of GI duration and HE-LTF size that cannot be indicated by the "GI+HE-LTF Size" field alone.

The device 500 may be a general-purpose computer or any other type of computing device or network device, including a main processor 530, a memory 520 and a transceiver 540 coupled to an array of antenna 501-504. The transceiver 540 includes a signal processor 510 having various modules of the transmit path which is configured to process a PPDU or any other type of communication transmission units. For instance, the signal processor 510 includes a receive First-In-First-Out (RX FIFO) 511, a synchronizer 512, a channel estimator and equalizer 513, a decoder 514, a demapper 515, a deinterleaver 516, a fast Fourier transformer (FFT) 517, and a descrambler 518.

The memory 530 stores PPDU format 521 including the format used for redefine the "GI+HE-LTF Size" field. The PPDU processing module 522 stores processor-executable instructions for resolving various sections of the PPDU, including the preamble according to the PPDU format 521. Once the signal processor 510 detects that the fields of DCM, STBC and the GI+HE-LTF Size in combination indicate a redefined GI/HE-LTF mode and based on the instructions from the PPDU processing module 522, the signal processor 510 processes the preamble and the HE-LTF field accordingly, as described in detail with reference to FIGS. 1 and 3.

It will be appreciated that each of the signal processors in FIG. 4 and FIG. 5 may include a wide range of other suitable components that are well known in the art. The various components can be implemented in any suitable manner that is well known in the art and can be implemented using hardware logic, software logic or a combination thereof. Further, in some embodiments, the transceiver 410 in FIG. 4 may as well include the components in a receive path as described in greater detail with reference to the transceiver 510 in FIG. 5, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising,
    setting a first field of a Physical Layer Convergence Protocol (PLCP) protocol data unit (PPDU) to a first value that indicates a selected high efficiency long training field (HE-LTF) size;
    according to said selected HE-LTF size:
        setting a second field of said PPDU to a second value equal to 1 to indicate enablement of Dual Sub-Carrier Modulation (DCM) on a data field of said PPDU; and
        setting a third field of said PPDU to a third value equal to 1 to indicate enablement of space time block coding (STBC) on said data field of said PPDU with said second field set to said second value; and
    transmitting said PPDU,
    wherein a combination of said second value being equal to 1 in said second field and said third value being equal to 1 in said third field resultant from said settings indicates neither DCM enablement nor STBC enablement on said PPDU, and further indicates that the first value in said first field comprises valid data for indicating the selected HE-LTF size and a guard interval of less than 3.2 µs.

2. The method of claim 1, wherein said first field, said second field, said third field are comprised in a HE-SIG-A field of said PPDU.

3. The method of claim 1, wherein said transmitting comprises transmitting said PPDU in a single user (SU) transmission.

4. A method of wireless communication, said method comprising:
    receiving a Physical Layer Convergence Protocol (PLCP) protocol data unit (PPDU);
    responsive to said receiving, determining that a first field in said PPDU has a first value that indicates a high efficiency (HE) long training field (HE-LTF) size;
    responsive to said receiving, determining that a second field in said PPDU has a second value equal to 1 that indicates enablement of Dual Sub-Carrier Modulation (DCM) on a data field of said PPDU; and
    responsive to said receiving, determining that a third field of said PPDU has a third value equal to 1 that indicates enablement of space time block coding (STBC) on a data field of said PPDU with said second field indicating said enablement of DCM on said data field; and
    based on said determinings, resolving an HE-LTF field of said PPDU using the HE-LTF size, wherein the first value in said first field comprises valid data for indicating a guard interval (GI) of less than 3.2 µs;
    wherein said resolving comprises, based on said determining, resolving said PPDU as neither DCM nor STBC is applied on said PPDU.

5. The method of claim 4 further comprising:
    determining that:
        said first value in said first field in said PPDU indicates a non-4× HE LTF mode;
        said second value in said second field in said PPDU indicates enablement of Dual Sub-Carrier Modulation (DCM) on said data field of said PPDU; and
        said third value in said third field of said PPDU indicates enablement of space time block coding (STBC) on said data field of said PPDU; and
    declaring an error for said PPDU.

6. A device operable to transmit PPDUs through a wireless communication network, said device comprising:
    a memory;
    a processor coupled to said memory;
    an antenna; and
    a transceiver comprising a signal processor and coupled to said processor, said memory and said antenna, said transceiver configured to:
        set a first field of a Physical Layer Convergence Protocol (PLCP) protocol data unit (PPDU) to a first value that indicates a selected high efficiency (HE) long training field (LTF) mode;
        according to said selected HE LTF mode, set a second field of said PPDU to a second value equal to 1 that indicates enablement of Dual Sub-Carrier Modulation (DCM) on a data field of said PPDU;

set a third field of said PPDU to a third value equal to 1 that indicates enablement of space time block coding (STBC) for said PPDU with said second field set to indicate said enablement of DCM; and send said PPDU to said antenna for transmission over said wireless communication network, wherein a combination of said second value in said second field being equal to 1 and said third value in said third field being equal to 1 resultant from settings indicates neither DCM enablement nor STBC enablement on said PPDU, and further indicates that the first value in said first field comprises valid data for indicating the selected HE-LTF mode and a guard interval of less than 3.2 µs.

7. The device of claim 6, wherein said first field, said second field, said third field are comprised in a preamble of said PPDU.

8. The device of claim 6, wherein said PPDU is transmitted in a single user (SU) transmission.

9. A device operable to receive PPDUs through a wireless communication device, said device comprising:

a memory;

a processor coupled to said memory; and a transceiver comprising a signal processor and configured to:

receive a Physical Layer Convergence Protocol (PLCP) protocol data unit (PPDU) transmitted through a wireless network;

responsive to receiving said PPDU, detect that a first field in said PPDU has a first value that indicates a selected high efficiency (HE) long training field (LTF) mode;

responsive to said receiving said PPDU, detect that a second field in said PPDU has a second value set to 1 indicating enablement of Dual Sub-Carrier Modulation (DCM) on a data field of said PPDU; and responsive to said receiving said PPDU, detect that a third field of said PPDU has a third value set to 1 indicating enablement of space time block coding (STBC) for said PPDU with said second field having said second value; and based on said second field being equal to 1 and said third field being equal to 1, resolve said PPDU using the selected HE-LTF mode and a guard interval of less than 3.2 µs, wherein said PPDU is resolved as neither DCM nor STBC is enabled on said data field.

10. The device of claim 9, wherein said transceiver is further configured to determine that:

said first value in said first field in said PPDU indicates a non-4× HE LTF mode;

said second value in said second field in said PPDU indicates enablement of Dual Sub-Carrier Modulation (DCM) on a data field of said PPDU; and said third value in said third field of said PPDU indicates enablement of space time block coding (STBC) for said PPDU with said second field indicating said enablement of DCM on said data field; and based on said first field, said second field and said third field, declare an error for said PPDU.

* * * * *